(12) United States Patent
Xiong

(10) Patent No.: US 9,329,436 B2
(45) Date of Patent: May 3, 2016

(54) LIQUID CRYSTAL PANEL AND LIQUID CRYSTAL DEVICE FOR ELIMINATING IMAGE RESIDUES

(71) Applicant: Shenzhen China Star Optoelectronics Technology Co., Ltd., Shenzhen, Guangdong (CN)

(72) Inventor: Yuan Xiong, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 121 days.

(21) Appl. No.: 14/234,629

(22) PCT Filed: Nov. 22, 2013

(86) PCT No.: PCT/CN2013/087655
§ 371 (c)(1),
(2) Date: Jan. 23, 2014

(87) PCT Pub. No.: WO2015/070477
PCT Pub. Date: May 21, 2015

(65) Prior Publication Data
US 2015/0138490 A1 May 21, 2015

(30) Foreign Application Priority Data
Nov. 15, 2013 (CN) .......................... 2013 1 0574239

(51) Int. Cl.
*G02F 1/1333* (2006.01)
*G02F 1/1335* (2006.01)
*G02F 1/1337* (2006.01)
*G02F 1/1362* (2006.01)

(52) U.S. Cl.
CPC ........ *G02F 1/1337* (2013.01); *G02F 1/133512* (2013.01); *G02F 1/133514* (2013.01); *G02F 1/133711* (2013.01); *G02F 2001/136222* (2013.01)

(58) Field of Classification Search
CPC ................... G02F 1/133512; G02F 1/136209; G02F 2001/133388; G02F 1/1339; G02F 1/133514; G02F 1/133516; G02F 1/1333; G02F 1/133305; G02F 1/133351
USPC .......................................... 349/110, 106, 158
See application file for complete search history.

(56) References Cited

U.S. PATENT DOCUMENTS 6,124,910 A * 9/2000 Nishida ............. G02F 1/133512
349/110
6,674,495 B1 * 1/2004 Hong ................. G02F 1/136209
349/43

(Continued)

FOREIGN PATENT DOCUMENTS

CN 202631906 U 12/2012
CN 202631906 U * 12/2012 ............ G02F 1/1337
CN 202975541 U 6/2013

*Primary Examiner* — Mike Qi
(74) *Attorney, Agent, or Firm* — Andrew C. Cheng

(57) ABSTRACT

A liquid crystal panel includes a first substrate, a second substrate, and a liquid crystal layer between the first substrate and the second substrate. The first substrate includes a display area having a black matrix and a peripheral area surrounding the display area. At least one opening is arranged on the black matrix of the peripheral area. The second substrate includes at least one masking unit arranged corresponding to the openings. In addition, a liquid crystal device including the above liquid crystal panel is also disclosed. By arranging the openings on the black matrix of the peripheral area of the first substrate, the UV rays are prevented from being absorbed by the black matrix. As such, residue of the reactive monomer left within the liquid crystal layer is decreased and display performance is enhanced. Also, the light leakage occurring due to the openings is avoided.

8 Claims, 2 Drawing Sheets

(56) References Cited

U.S. PATENT DOCUMENTS

| | | | |
|---|---|---|---|
| 6,882,398 B2 * | 4/2005 | Watanabe | G02F 1/133512 349/153 |
| 8,194,305 B2 * | 6/2012 | Maeda | G02B 26/0841 359/290 |
| 2007/0273821 A1 * | 11/2007 | Liou | G02F 1/1339 349/153 |

* cited by examiner

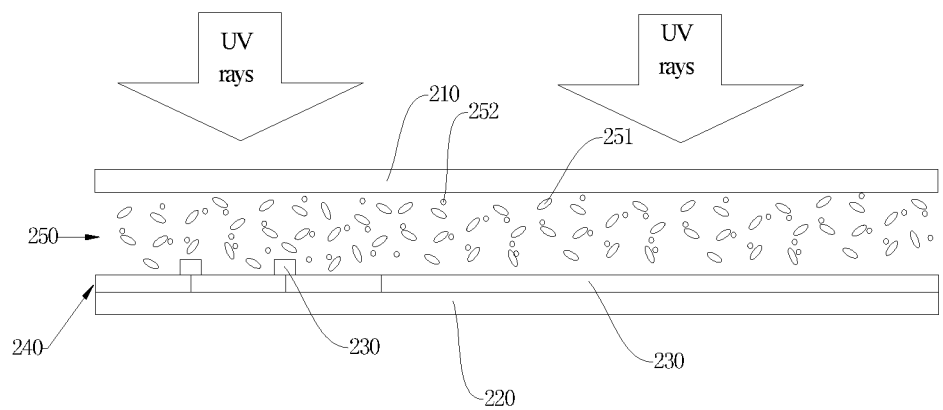
Fig 1    (Prior Art)
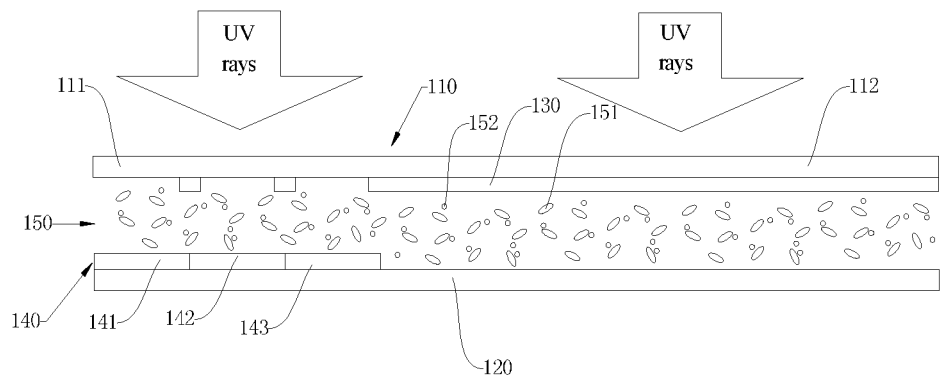
Fig 2    (Prior Art)

LIQUID CRYSTAL PANEL AND LIQUID CRYSTAL DEVICE FOR ELIMINATING IMAGE RESIDUES

BACKGROUND OF THE INVENTION

1. Field of the Invention

The present disclosure relates to liquid crystal display technology, and more particularly to a liquid crystal panel and a liquid crystal display (LCD).

2. Discussion of the Related Art

LCDs are characterized by attributes such as thinner, power-saving, low radiation, and so on, and thus are greatly adopted. Currently, most of the LCDs are backlight-type, including a liquid crystal panel and a backlight module. Liquid crystal molecules are arranged between two parallel glass substrates. The alignment of the liquid crystal molecules are controlled by applying a voltage to the glass substrates such that the light beams from the backlight module are reflected to generate images.

The liquid crystal molecules alignment is the key technology regarding liquid crystal display. The alignment plays an important role in display performance. High quality images can only be obtained by stably and uniformly arranged liquid crystal molecules. Generally, alignment layers, which are thin layers, are adopted to align the liquid crystal molecules. Currently, Polymer Stabilized Vertical Alignment (PSVA) LCDs, made by Polymer Stabilized Alignment (PSA) process, are characterized by attributes such as wide viewing angle, high aperture rate, and high contrastness, and thus are greatly adopted.

Regarding the PSVA LCDs, the liquid crystals between the two transparent substrates are doped with reactive monomer. Surfaces of each of the transparent substrate coated with polyimide (PI) are the alignment substrates. Afterward, the two transparent substrates are applied with the voltage and are irradiated by ultraviolet rays (UV). Phase separation phenomenon occurs by the reactive monomer and the liquid crystals so as to form polymer on the alignment substrates. The liquid crystals are aligned along the direction of the polymer due to the interaction between the polymer and the liquid crystals. Thus, the liquid crystal molecules between the transparent substrates have the pre-tile angle.

Referring to FIG. 1, the conventional liquid crystal panel includes an up substrate 210, a down substrate 220 opposite to the up substrate 210, and a liquid crystal layer 250. The up substrate 210 is a thin film transistor (TFT) array substrate. The down substrate 220 is arranged a color filer (CF) layer 240 and a black matrix 230 arranged above the down substrate 220. During the PSVA alignment process, UV rays irradiate from one side of the up substrate 210 such that the UV rays are prevented from being absorbed by the CF layer 240 and the black matrix 230. As such, the reactive monomer 252 is separated from the liquid crystal molecules 251, and the polymer are formed on the alignment substrate of the up substrate 210 and the down substrate 220. However, the above liquid crystal panel has a lower resolution, and the aperture rate of pixels is also low. In addition, the misalignment may occur when bonding the CF layer 240 with the TFT array substrate.

Recently, a new technology "color filter on array (COA)" is proposed, which relates to directly bonding the CF layer on the TFT array substrate, which would not results in misalignment. In addition, the liquid crystal panel has better resolution, and the aperture rate of the pixel is also higher. Referring to FIG. 2, the conventional COA liquid crystal panel includes a first substrate 110, a second substrate 120 opposite to the first substrate 110, and a liquid crystal layer 150 arranged between the first substrate 110 and the second substrate 120. The first substrate 110 includes a display area 111 having the black matrix 130 and a peripheral area 112 surrounding the display area 111. The second substrate 120 is the TFT array substrate. The second substrate 120 includes a color filter layer 140 having a red color filter unit 141, a green color filter unit 142, and a blue color filter unit 143. During the PSVA alignment process, the UV rays irradiate from one side of the first substrate 110. However, as the black matrix 130 on the peripheral area 112 of the first substrate 110 absorbs the UV rays, residues of the reactive monomer may be left on the liquid crystal layer 150. After being driven for a long time period, the reactive monomer 152 with charges may generate charged ions. Thus, the distribution of the reactive monomer 152 with charges and the charged ions may change so as to deteriorate the performance of the liquid crystal panel. Specifically, after being driven for a long time period, the reactive monomer 152 with charges and the charges ions within the liquid crystal layer 150 are separated according to their polarity. The separated reactive monomer 152 and the charged ions consumes a portion of the bias voltage applied to the liquid crystal layer, which results in the screen effect. In addition, the reactive monomer 152 with charges and the charged ions generate parasitic potential within the liquid crystal panel, which leads to V_com shift.

SUMMARY

In order to overcome the above problems, the liquid crystal panel of the claimed invention prevents the residuals of the reactive monomer from being left during the PSVA process so as to enhance the display performance of the liquid crystal panel.

In one aspect, a liquid crystal panel includes: a first substrate, a second substrate, and a liquid crystal layer between the first substrate and the second substrate, the first substrate includes a display area having a black matrix and a peripheral area surrounding the display area, and at least one opening is arranged on the black matrix of the peripheral area. Wherein the second substrate includes at least one masking unit arranged corresponding to the openings.

Wherein the masking units are overlapped photoresist layers.

Wherein the overlapped photoresist layers are overlapped red/blue photoresist layers, red/green photoresist layers, blue/green photoresist layers, or red/blue/green photoresist layers.

Wherein the masking unit overlaps with the area of the black matrix of the first substrate comprising the openings.

Wherein the openings of the first substrate are arranged corresponding to the areas on the second substrate that have not been arranged with cross-line transparent electrodes.

Wherein the openings of the first substrate are arranged corresponding to the areas on the second substrate that have not been arranged with cross-line transparent electrodes.

In another aspect, a liquid crystal device includes a liquid crystal panel. The liquid crystal panel includes: a first substrate, a second substrate, and a liquid crystal layer between the first substrate and the second substrate, the first substrate includes a display area having a black matrix and a peripheral area surrounding the display area, and at least one opening is arranged on the black matrix of the peripheral area.

Wherein the second substrate includes at least one masking unit arranged corresponding to the openings.

Wherein the masking units are overlapped photoresist layers.

Wherein the overlapped photoresist layers are overlapped red/blue photoresist layers, red/green photoresist layers, blue/green photoresist layers, or red/blue/green photoresist layers.

Wherein the masking unit overlaps with the area of the black matrix of the first substrate comprising the openings.

Wherein the openings of the first substrate are arranged corresponding to the areas on the second substrate that have not been arranged with cross-line transparent electrodes.

Wherein the openings of the first substrate are arranged corresponding to the areas on the second substrate that have not been arranged with cross-line transparent electrodes.

In view of the above, by arranging the openings on the black matrix of the peripheral area of the first substrate, the UV rays are prevented from being absorbed by the black matrix. In this way, the residues of the reactive monomer left within the liquid crystal layer is decreased and thus the display performance of the liquid crystal panel is enhanced. At the same time, by adding the masking units corresponding to the openings of the black matrix, the light leakage occurring due to the openings is avoided.

BRIEF DESCRIPTION OF THE DRAWINGS

FIG. 1 is a schematic view showing the UV radiation during a conventional PSVA alignment process of liquid crystal panels.

FIG. 2 is a schematic view showing the UV radiation during a conventional PSVA alignment process of COA liquid crystal panels.

DETAILED DESCRIPTION OF THE EMBODIMENTS

Embodiments of the invention will now be described more fully hereinafter with reference to the accompanying drawings, in which embodiments of the invention are shown.

Figure 3:
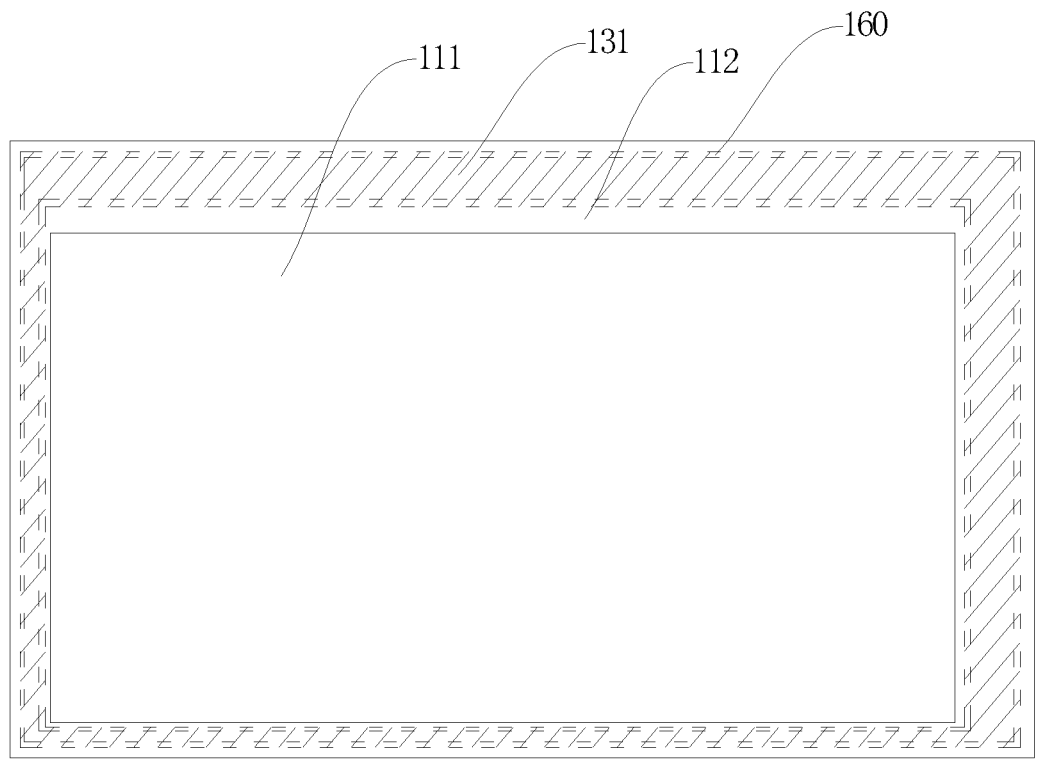
FIG. 3 is a top view of the liquid crystal panel in accordance with one embodiment.
Figure 4:
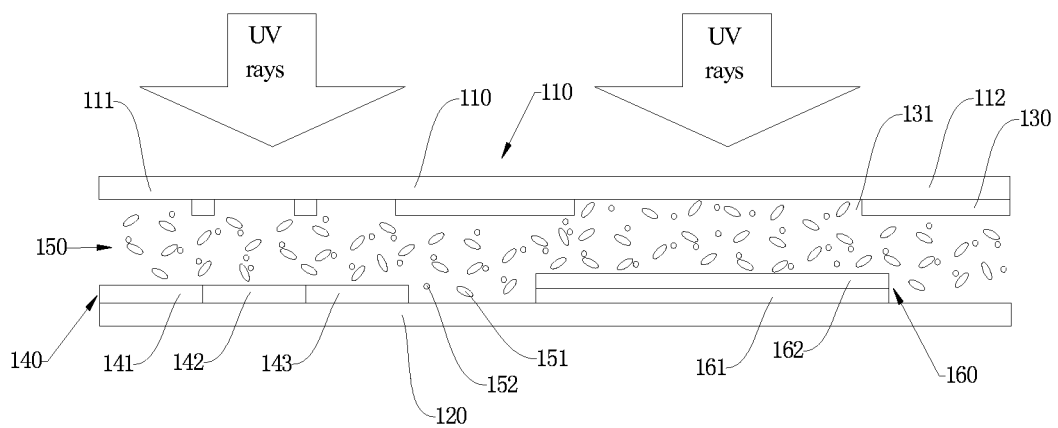
FIG. 4 is a schematic view showing the UV radiation during a PSVA alignment process of the liquid crystal panel of FIG. 3.

FIGS. 3 and 4 are the top view of the liquid crystal panel and the schematic view of the UV radiation during the PSVA alignment process in accordance with one embodiment. In one embodiment, the liquid crystal panel includes a first substrate 110, a second substrate 120 opposite to the first substrate 110, and a liquid crystal layer 150 between the first substrate 110 and the second substrate 120. The first substrate 110 includes a display area 111 having a black matrix and a peripheral area 112 surrounding the display area 111. The second substrate 120 is a TFT array substrate. The second substrate 120 includes a color filter layer 140 corresponding to the display area 111. The color filter layer 140 includes a red color-filter unit 141, a green color-filter unit 142, and a blue color-filter unit 143. In order to prevent the UV rays from being absorbed by the black matrix during the PSVA process, at least one opening 131 is arranged on the black matrix 130 of the peripheral area 112 of the first substrate 110.

During the PSVA alignment process, the UV rays radiate from one side of the first substrate 110. As the opening 131 are arranged on the black matrix 130 of the peripheral area 112 of the first substrate 110, instead of being absorbed by the black matrix 130, the UV rays directly radiate on the liquid crystal layer 150 such that the reactive monomer 152 and the liquid crystal molecules 151 are separated and the polymers are formed on the alignment substrates of the first substrate 110 and the second substrate 120.

Furthermore, at least one masking unit 160 is arranged on the second substrate corresponding to the opening 131. The masking unit 160 includes at least two of the red photoresist layer, green photoresist layer, and blue photoresist layer that are overlapped. It is to be noted that the orders of the two photoresist layers are not limited. In the embodiment, the masking unit 160 includes a red photoresist layer 161 and a blue photoresist layer 162 overlapped once. In other embodiments, the masking unit 160 may be a light absorbing layer of the black matrix or a reflecting layer. In this way, the opening 131 of the peripheral area 112 is prevented from leaking lights during the operations of the liquid crystal panel. In addition, the masking unit 160 overlaps with the area of the black matrix 130 having the opening 131 of the second substrate 120. As such, light leakage occurring in the opening 131 of the peripheral area 112 is enhanced.

Furthermore, the opening 131 arranged on the black matrix 130 of the peripheral area 112 of the first substrate 110 is located corresponding to the areas on the second substrate 120, which has not been arranged with a cross-line transparent electrodes, so as to reduce the impact of the masking unit 160 toward the manufacturing process.

In one embodiment, a liquid crystal device includes the above liquid crystal panel.

In view of the above, by arranging the openings on the black matrix of the peripheral area of the first substrate, the UV rays are prevented from being absorbed by the black matrix. In this way, the residues of the reactive monomer left within the liquid crystal layer is decreased and thus the display performance of the liquid crystal panel is enhanced. At the same time, by adding the masking units corresponding to the openings of the black matrix, the light leakage occurring due to the openings is avoided.

It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal panel, comprising:
a first substrate, a second substrate, and a liquid crystal layer between the first substrate and the second substrate, the first substrate comprises a display area having a black matrix and a peripheral area surrounding the display area, and at least one opening is arranged on the black matrix of the peripheral area; and
wherein the second substrate comprises at least one masking unit arranged corresponding to the openings, and wherein the masking units are overlapped photoresist layers.

2. The liquid crystal panel as claimed in claim 1, wherein the overlapped photoresist layers are overlapped red/blue photoresist layers, red/green photoresist layers, blue/green photoresist layers, or red/blue/green photoresist layers.

3. The liquid crystal panel as claimed in claim 1, wherein the masking unit overlaps with the area of the black matrix of the first substrate comprising the openings.

4. The liquid crystal panel as claimed in claim 1, wherein the openings of the first substrate are arranged corresponding to the areas on the second substrate that have not been arranged with cross-line transparent electrodes.

5. A liquid crystal device comprises a liquid crystal panel, the liquid crystal panel comprises a first substrate, a second substrate, and a liquid crystal layer between the first substrate and the second substrate, the first substrate comprises a display area having a black matrix and a peripheral area surrounding the display area, and at least one opening is arranged on the black matrix of the peripheral area; and
wherein the second substrate comprises at least one masking unit arranged corresponding to the openings, and wherein the masking units are overlapped photoresist layers.

6. The liquid crystal device as claimed in claim 5, wherein the overlapped photoresist layers are overlapped red/blue photoresist layers, red/green photoresist layers, blue/green photoresist layers, or red/blue/green photoresist layers.

7. The liquid crystal device as claimed in claim 5, wherein the masking unit overlaps with the area of the black matrix of the first substrate comprising the openings.

8. The liquid crystal device as claimed in claim 5, wherein the openings of the first substrate are arranged corresponding to the areas on the second substrate that have not been arranged with cross-line transparent electrodes.

* * * * *